United States Patent
Yiu et al.

(10) Patent No.: US 10,470,068 B2
(45) Date of Patent: Nov. 5, 2019

(54) MEASUREMENT GAP REPETITION PATTERNS FOR INTER-FREQUENCY OFFLOADING IN HETEROGENEOUS WIRELESS NETWORKS

(71) Applicant: Intel IP Corporation, Santa Clara, CA (US)

(72) Inventors: Candy Yiu, Portland, OR (US); Yang Tang, Pleasanton, CA (US); Yujian Zhang, Beijing (CN); Rui Huang, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/835,173

(22) Filed: Dec. 7, 2017

(65) Prior Publication Data

US 2018/0227785 A1    Aug. 9, 2018

Related U.S. Application Data

(63) Continuation of application No. 14/488,774, filed on Sep. 17, 2014, now Pat. No. 9,867,073.

(60) Provisional application No. 61/933,860, filed on Jan. 30, 2014.

(51) Int. Cl.
*H04W 24/10* (2009.01)
*H04W 36/00* (2009.01)
*H04W 28/08* (2009.01)
*H04W 72/12* (2009.01)

(52) U.S. Cl.
CPC ....... *H04W 24/10* (2013.01); *H04W 36/0088* (2013.01); *H04W 28/08* (2013.01); *H04W 72/12* (2013.01)

(58) Field of Classification Search
None
See application file for complete search history.

(56) References Cited

U.S. PATENT DOCUMENTS

| 9,867,073 | B2 | 1/2018 | Yiu et al. |
| 2007/0037601 | A1 | 2/2007 | Mittal et al. |
| 2009/0042559 | A1 | 2/2009 | Choi |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, (Mar. 2014), 356.

(Continued)

*Primary Examiner* — Robert M Morlan
(74) *Attorney, Agent, or Firm* — Schwegman Lundberg & Woessner, P.A.

(57) ABSTRACT

An embodiment for user equipment that receives a plurality of measurement gap repetition patterns from a network. Each measurement gap repetition pattern may be assigned to a different frequency of the network. The plurality of measurement gap repetition patterns may include skipping measurement patterns. Further embodiments may include the user equipment receiving a repetition period in a measurement object frame or receiving a plurality of measurement gap repetition patterns in which the measurement gaps are non-colliding with measurement gaps of other repetition patterns assigned to the user equipment.

20 Claims, 10 Drawing Sheets

| 301 | 302 | 303 | 304 | 305 |
|---|---|---|---|---|
| GAP PATTERN ID | MEASUREMENT GAP LENGTH (MGL, ms) | MEASUREMENT GAP REPETITION PERIOD (MGRP, ms) | MINIMUM AVAILABLE TIME FOR INTER-FREQUENCY AND INTER-RAT MEASUREMENTS DURING 480ms PERIOD (TINTER1, ms) | MEASUREMENT PURPOSE |
| 0 | 6 | 40 | 60 | INTER-FREQUENCY E-UTRAN FDD AND TDD, UTRAN FDD, GERAN, LCR TDD, HRPD, CDMA2000 1x |
| 1 | 6 | 80 | 30 | INTER-FREQUENCY E-UTRAN FDD AND TDD, UTRAN FDD, GERAN, LCR TDD, HRPD, CDMA2000 1x |
| 2 | 6 | 160 | 15 | INTER-FREQUENCY E-UTRAN FDD AND TDD |
| 3 | 6 | 240 | 10 | INTER-FREQUENCY E-UTRAN FDD AND TDD |
| 4 | 6 | 480 | 5 | INTER-FREQUENCY E-UTRAN FDD AND TDD |

(56) References Cited

U.S. PATENT DOCUMENTS

| | | | |
|---|---|---|---|
| 2011/0080962 A1* | 4/2011 | Blankenship | H04B 7/2606 |
| | | | 375/259 |
| 2011/0274007 A1 | 11/2011 | Lin et al. | |
| 2013/0229971 A1 | 9/2013 | Siomina et al. | |
| 2014/0213310 A1 | 7/2014 | Yeh et al. | |
| 2015/0045024 A1 | 2/2015 | Lunden et al. | |
| 2015/0098416 A1* | 4/2015 | Kuo | H04W 72/10 |
| | | | 370/329 |
| 2015/0215837 A1 | 7/2015 | Yiu et al. | |
| 2016/0192339 A1* | 6/2016 | Axmon | H04W 24/10 |
| | | | 370/329 |
| 2016/0337916 A1* | 11/2016 | Deenoo | H04W 8/22 |
| 2017/0055202 A1 | 2/2017 | Uchiyama et al. | |

OTHER PUBLICATIONS

"U.S. Appl. No. 14/488,774, Non Final Office Action dated Feb. 24, 2017", 17 pgs.

"U.S. Appl. No. 14/488,774, Notice of Allowability dated Sep. 21, 2017", 4 pgs.

"U.S. Appl. No. 14/488,774, Notice of Allowance dated Aug. 30, 2017", 8 pgs.

"U.S. Appl. No. 14/488,774, Response Filed May 24, 2017 to Non Final Office Action dated Feb. 24, 2017", 9 pgs.

"Evolved Universal Terrestrial Radio Access (E-UTRA) and Evolved Universal Terrestrial Radio Access Network (E-UTRAN)", 3GPP TS 36.300 v11.6.0 Technical Specification Group Radio Access Network. Release 11, (Jun. 2013), 209 pgs.

"Requirements for support of radio resource management", 3rd Generation Partnership Project; Technical Specification Group Radio Access Network; Evolved Universal Terrestrial Radio Access (E-UTRA); Release 12 (3GPP TS 36.133 V12.4.0), (Jul. 2014), 870 pgs.

* cited by examiner

Fig. 1

| Gap Pattern ID (301) | Measurement Gap Length (MGL, ms) (302) | Measurement Gap Repetition Period (MGRP, ms) (303) | Minimum available time for inter-frequency and inter-RAT measurements during 480ms period (Tinter1, ms) (304) | Measurement Purpose (305) |
|---|---|---|---|---|
| 0 | 6 | 40 | 60 | Inter-frequency E-UTRAN FDD and TDD, UTRAN FDD, GERAN, LCR TDD, HRPD, CDMA2000 1x |
| 1 | 6 | 80 | 30 | Inter-frequency E-UTRAN FDD and TDD, UTRAN FDD, GERAN, LCR TDD, HRPD, CDMA2000 1x |
| 2 | 6 | 160 | 15 | Inter-frequency E-UTRAN FDD and TDD |
| 3 | 6 | 240 | 10 | Inter-frequency E-UTRAN FDD and TDD |
| 4 | 6 | 480 | 5 | Inter-frequency E-UTRAN FDD and TDD |

MEASUREMENT GAP REPETITION PATTERNS FOR INTER-FREQUENCY OFFLOADING IN HETEROGENEOUS WIRELESS NETWORKS

This application is a continuation of U.S. patent application Ser. No. 14/488,774, filed Sep. 17, 2014, now issued as U.S. Pat. No. 9,867,073, which claims the benefit of priority under 35 U.S.C. 119(e) to U.S. Provisional Patent Application Ser. No. 61/933,860, filed on Jan. 30, 2014, each of which is incorporated herein by reference in its entirety.

TECHNICAL FIELD

Embodiments described herein generally relate to wireless networks. Some embodiments relate generally to measurement gap repetition patterns for user equipment in a wireless network.

BACKGROUND

Wireless networks may enable mobile devices (e.g., user equipment (UE)) to communicate within that network with a fixed landline infrastructure (e.g., base stations, radio access network (RAN)). For example, in a cellular mobile network, user equipment may communicate with a fixed base station over a wireless channel.

In Heterogeneous Wireless Networks pico- and/or femto-cells may be deployed in different frequency layers for offloading purposes. For example, if one frequency in a macro-cell gets overloaded with traffic, the system may transfer certain UE to a different frequency associated with an overlaid pico- or femto-cell in order to relieve the burden on the macro-cell frequency.

In current $3^{rd}$ Generation Partnership Project (3GPP)/Long Term Evolution (LTE) standard networks, a measurement gap is defined as a period that the UE may use to perform measurements. In other words, there is no uplink or downlink transmissions scheduled during the measurement gap time. The UE, as configured by the network, may perform periodic measurements for the inter-frequency layers for each measurement gap period. If cells have substantially the same coverage area, measurements may not need to be performed as often or at all. The UE may consume excess power as a result of performing unnecessary measurements.

There are general needs for improving system performance and reducing unnecessary UE power consumption in a wireless network.

DETAILED DESCRIPTION

Figure 1:
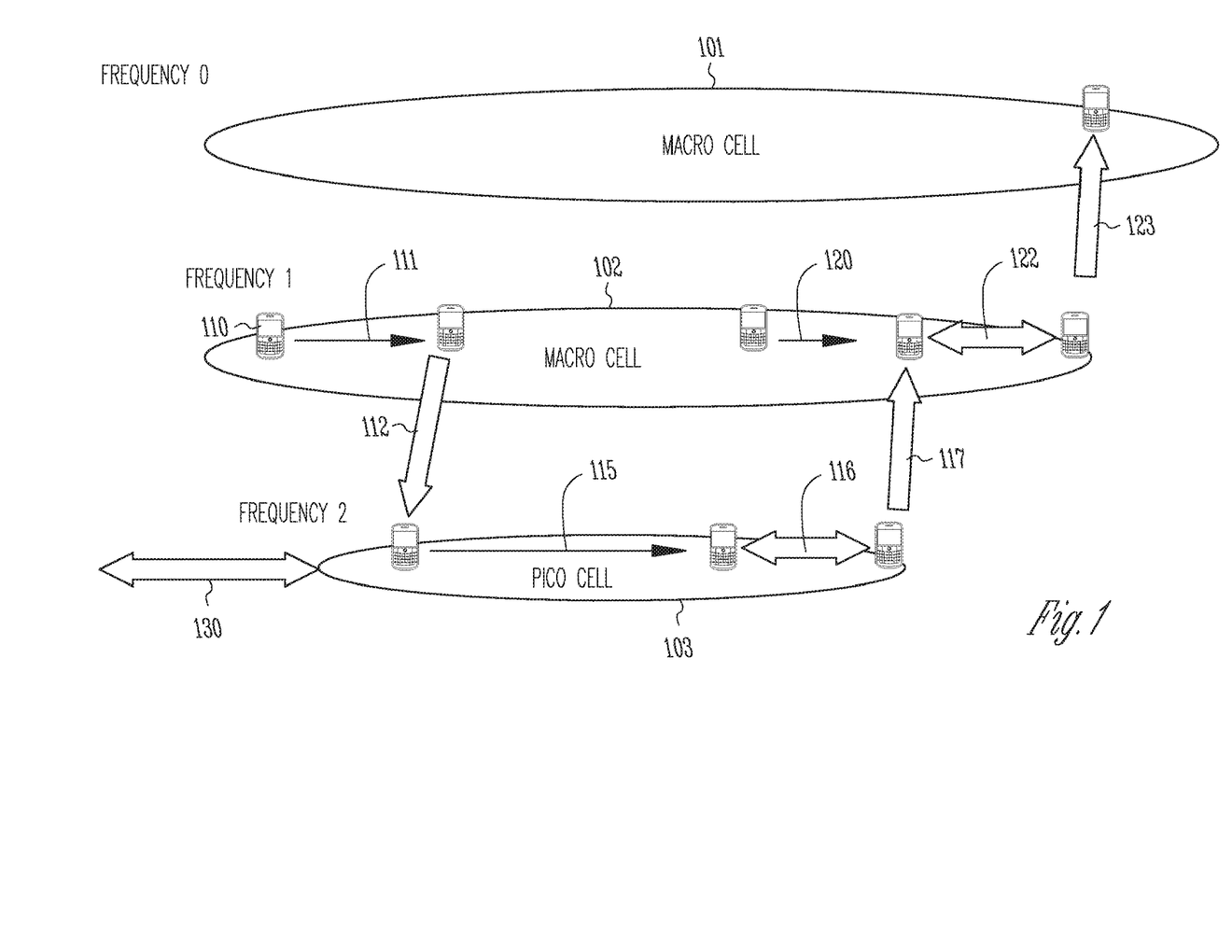
FIG. 1 illustrates a diagram of a plurality of overlaid cells in a heterogeneous wireless network in accordance with some embodiments.

FIG. 1 illustrates a diagram of a plurality of overlaid cells in a heterogeneous wireless network. The diagram shows two macro-cells 101, 102 and an overlaid pico-cell 103. Each cell 101-103 is shown with a different assigned frequency. For example, frequency 0 is assigned to the first macro-cell 101, frequency 1 is assigned to the second macro-cell 102, and frequency 2 is assigned to the pico-cell 103. Both macro-cells 101, 102 (e.g., coverage cells, normal performance group cells) have a substantially similar coverage area while the pico-cell 103 is deployed for offloading UE 110 (e.g., offloading cell, reduced performance group cells) when the macro-cell's associated frequencies become overloaded with traffic. Each of the macro and pico-cells may be generated by a respective base station (e.g., eNodeB) having one or more radios coupled to one or more antennas for communicating over wireless channels.

FIG. 1 also shows the movement and handover of a single UE 110. The UE 110 is initially registered with Frequency 1 in the second macro-cell 102. As the UE 110 moves 111 closer to the center of the macro-cell 102, it is performing inter-frequency measurements 130 (e.g., signal strength) while communicating on Frequency 1. It then experiences a handover 112 to the overlaid pico-cell 103 and Frequency 2 based on the inter-frequency measurements 130, Frequency 1 traffic load, and/or network conditions.

The UE 110 may then travel 115 towards the edge of the pico-cell 103. It may perform inter-frequency measurements 116 as it moves and communicates on Frequency 2. The UE 110 may experience a handover 117 back to Frequency 1 of the second macro-cell 102 based on the inter-frequency measurements 116, Frequency 2 traffic load, and/or network conditions.

The UE 110 may then travel 120 towards the edge of the second macro-cell 102 while communicating on Frequency 1 and performing inter-frequency measurements 122. The UE may then experience a handover 123 to the first macro-cell 101 based on inter-frequency measurements 122, Frequency 1 traffic load, and/or network conditions.

The UE 110 may need to perform measurements for all inter-frequency layers (e.g., Frequencies 1 and 2 in FIG. 1) for each measurement gap period configured by the network. It can be seen in FIG. 1 that Frequencies 0 and 1 have the same coverage area. UEs in the first macro-cell with Frequency 0 may not need to perform measurements in Frequency 1 (or may perform less often). The UE should still perform inter-frequency detection for the pico-cell 103 in Frequency 2. However, under the present LTE specification, the network can only configure one measurement gap repetition pattern for each UE. The network cannot configure different measurement gap repetition patterns for different frequencies or for different purposes. This may result in multiple problems for the UE. For example, the UE may have increased power consumption from performing unnecessary measurements, the UE cannot have uplink/downlink transmissions during the measurement gaps, thus degrading the data rate, and the discovery of neighboring cells may be delayed.

To address these and other problems, the network may provide multiple measurement gap repetition patterns per UE by assigning measurement gap repetition patterns (including assigning measurement gap skipping patterns). The network may also assign one of two different measurement gap repetition patterns, one for coverage cells and one for offloading cells. The network may also assign a measurement gap repetition pattern for normal use and another for proximity use. The network may also assign a measurement gap repetition pattern and a repetition period in a measurement object frame. The network may also assign multiple measurement gap repetition patterns per UE with non-colliding measurement gaps. Additionally, the network may also assign a measurement gap patter per UE with different measurement criteria per frequency layer or groups of frequency layers.

Figure 2:
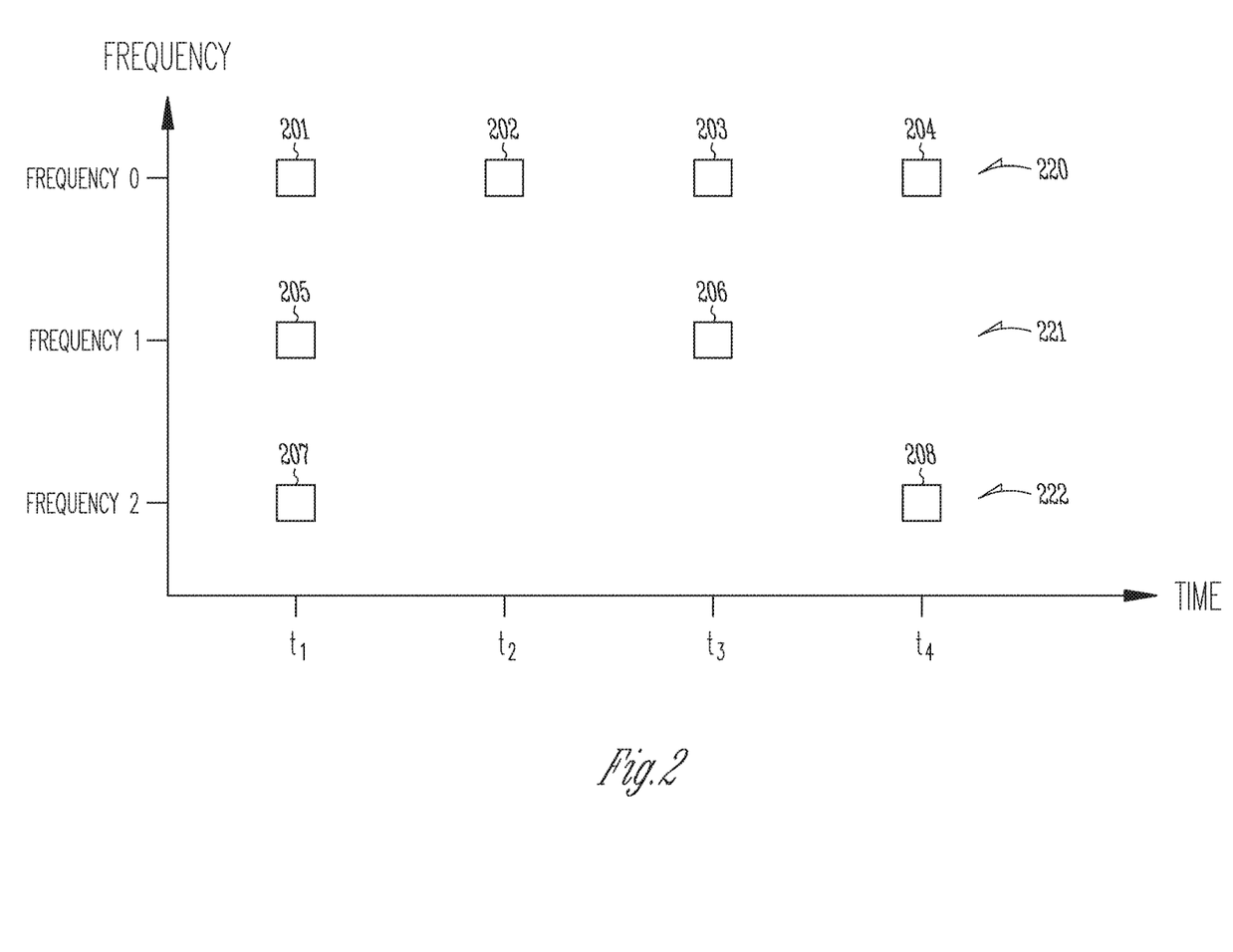
FIG. 2 illustrates a diagram of an embodiment of multiple measurement gap repetition periods assigned to a UE.

FIG. 2 illustrates a diagram of an embodiment of multiple measurement gap repetition patterns 220-222. For purposes of illustration and brevity, FIG. 2 shows only measurement repetition patterns for three different frequencies. The disclosed embodiments are not limited to any set number of frequencies or repetition patterns.

Each square of FIG. 2 represents a different measurement gaps 201-208 with a particular time period (e.g., $t_2-t_1$, $t_3-t_1$, $t_4-t_1$) between pairs of adjacent measurement gaps 201-208. Each frequency layer (e.g., Frequency 0, Frequency 1, Frequency 2) is assigned a different measurement gap repetition pattern 220-222 by the network.

It may be noted that, while multiple measurement gaps may be shown at some time periods (e.g., $t_1$, $t_2$, $t_4$), the UE may not typically perform measurements on each of those different frequencies substantially simultaneously. If the UE had multiple radios, where each radio is capable of operating on a different frequency, the UE may then have the capability of operating on multiple frequencies substantially simultaneously.

In the embodiment illustrated in FIG. 2, the network may configure and assign multiple measurement gap repetition patterns per UE. For example, the three different measurement gap repetition patterns 220-222 of FIG. 2 may be assigned to one UE with a measurement gap repetition pattern 220-222 per frequency. This may enable the network to optimize settings on different measurement gap repetition patterns 220-222 per frequency layer. While FIG. 2 shows each measurement gap repetition pattern 220-222 as being associated with one frequency, each measurement gap repetition pattern 220-222 may be associated with one or more frequencies.

In an embodiment, a measurement gap repetition period may be multiples of the smallest period used to align UE measurements. Such an embodiment may reduce the number of times that the UE performs measurements and may avoid measurement collisions.

FIG. 2 shows an example of three different frequency layers (e.g., Frequency 0, Frequency 1, Frequency 2) with different measurement gap repetition periods. For example, Frequency 0 may have a measurement gap repetition period of $t_2-t_1$. Frequency 1 may have a measurement gap repetition period of $t_3-t_1=2*$(measurement gap repetition of Frequency 0). Frequency 2 may have a measurement gap repetition period of $t_4-t_1=3*$(measurement gap repetition period of Frequency 0). Thus, this embodiment uses some multiple of the shortest measurement gap repetition period.

As an example of operation, Frequency 2 may be deployed in a macro-cell. Since a macro-cell is typically larger than pico/femto cells, the UE may not need to perform inter-frequency measurements as often as in other types of cells or with other frequencies if the channel quality does not change as often as a smaller cell or a more congested cell. Frequency 0 may be assigned to a pico-cell where the UE may need to perform inter-frequency measurements more often.

Figure 3:
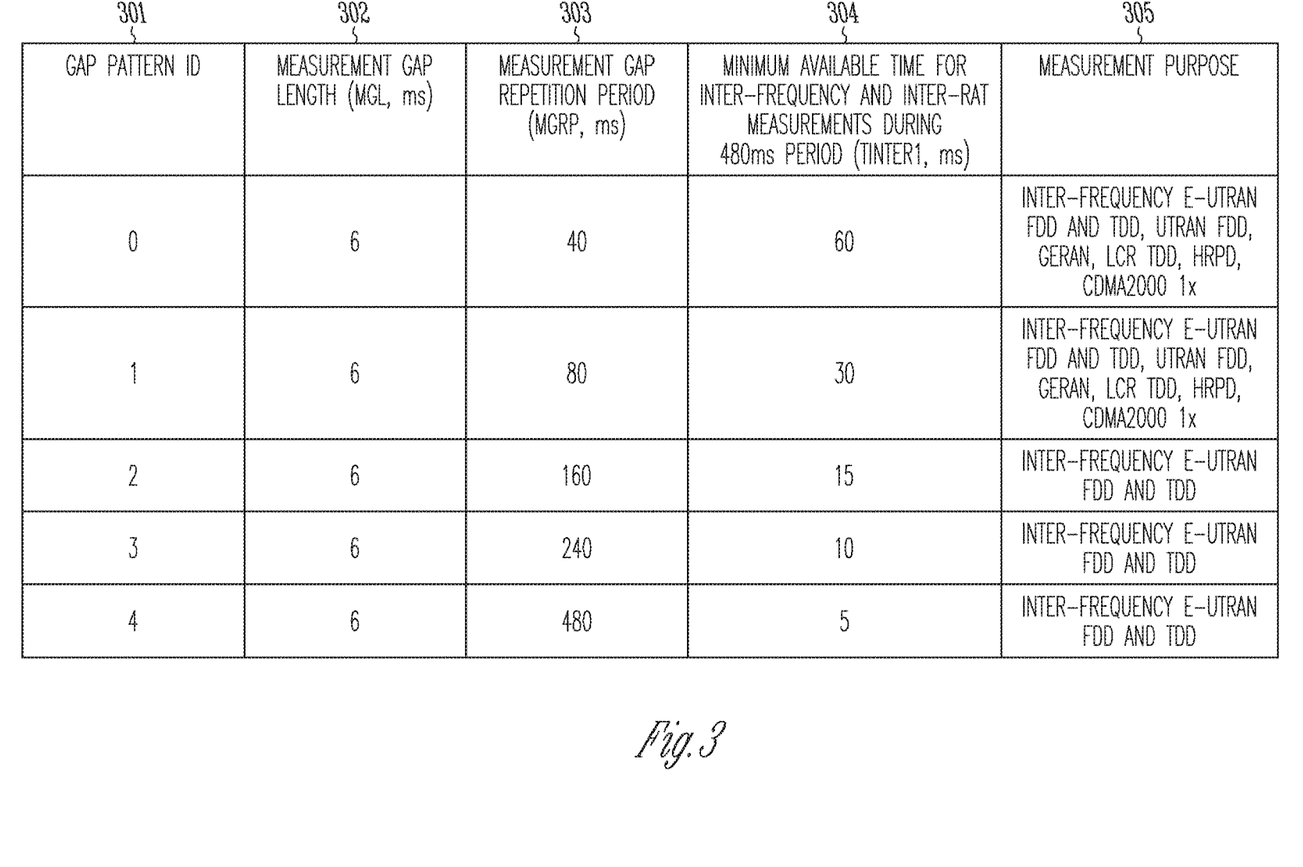
FIG. 3 illustrates a table of measurement gap repetition pattern configurations as supported by the UE in accordance with the embodiment of FIG. 2.

FIG. 3 illustrates a table of measurement gap repetition pattern configurations as supported by the UE in accordance with the embodiment of FIG. 2. The time values shown in the table are for purposes of illustration only. Other embodiments may use different time periods.

The table includes a column 301 of identifications (e.g., 0-4) for each of five different measurement gap repetition patterns. Another column 302 illustrates a measurement gap time period. This value may be set by the LTE standard. Another column 303 illustrates different measurement gap repetition periods, as described previously with reference to FIG. 2. For example, Gap Pattern ID 0 has the shortest period at 40 milliseconds (ms). Gap Pattern ID 1 is twice the shortest time period (e.g., 80 ms), Gap Pattern ID 2 is four times the shortest time period (e.g., 160 ms), Gap Pattern ID 3 is six times the shortest time period (e.g., 240 ms), and Gap Pattern ID 4 is twelve times the shortest time period (e.g., 480 ms).

The next column 304 illustrates a minimum time available for inter-frequency and inter-radio access technology (RAT) measurements during a typical 480 ms time period as specified by the LTE standard. Another column 305 illustrates a measurement purpose for each Gap Pattern ID. The table shows that as the measurement gap repetition period increases, the minimum time available for inter-frequency/inter-RAT measurements decreases.

Figure 4:
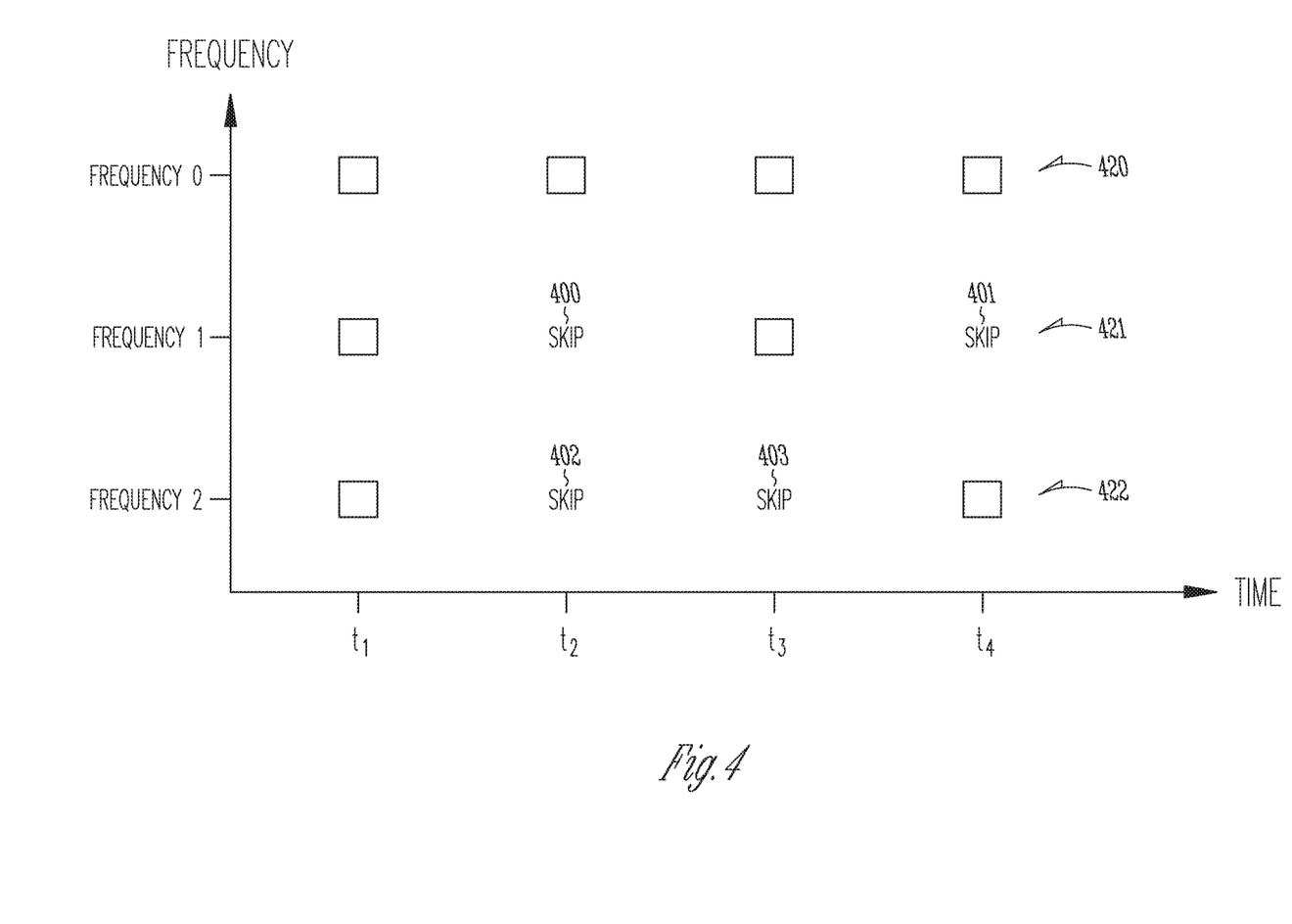
FIG. 4 illustrates a diagram of an embodiment of measurement gap skipping as assigned to a UE.

FIG. 4 illustrates a diagram of an embodiment of measurement gap skipping. Three different measurement gap repetition patterns are shown for purposes of illustration and brevity. The disclosed embodiments are not limited to any particular number of frequencies or measurement gap repetition patterns.

While the network in the embodiment of FIG. 2 assigned measurement gap repetition patterns that included the times at which the UE is to perform a measurement gap, the network in the embodiment of FIG. 4 assigns measurement gap repetition patterns that include the times 400-403 at which the UE is not to perform (e.g., skip) a measurement gap.

Frequency 0 is assigned the shortest repetition period where a measurement gap occurs every $t_2-t_1$ 420. Thus, the UE is assigned not to skip any measurement periods for Frequency 0. Frequency 1 is assigned a repetition period of $t_3-t_1$ such that the UE is assigned to skip every other measurement period 400, 401. Frequency 2 is assigned a repetition period of $t_4-t_1$ such that the UE is assigned to skip every two measurement periods 402, 403.

Figure 5:
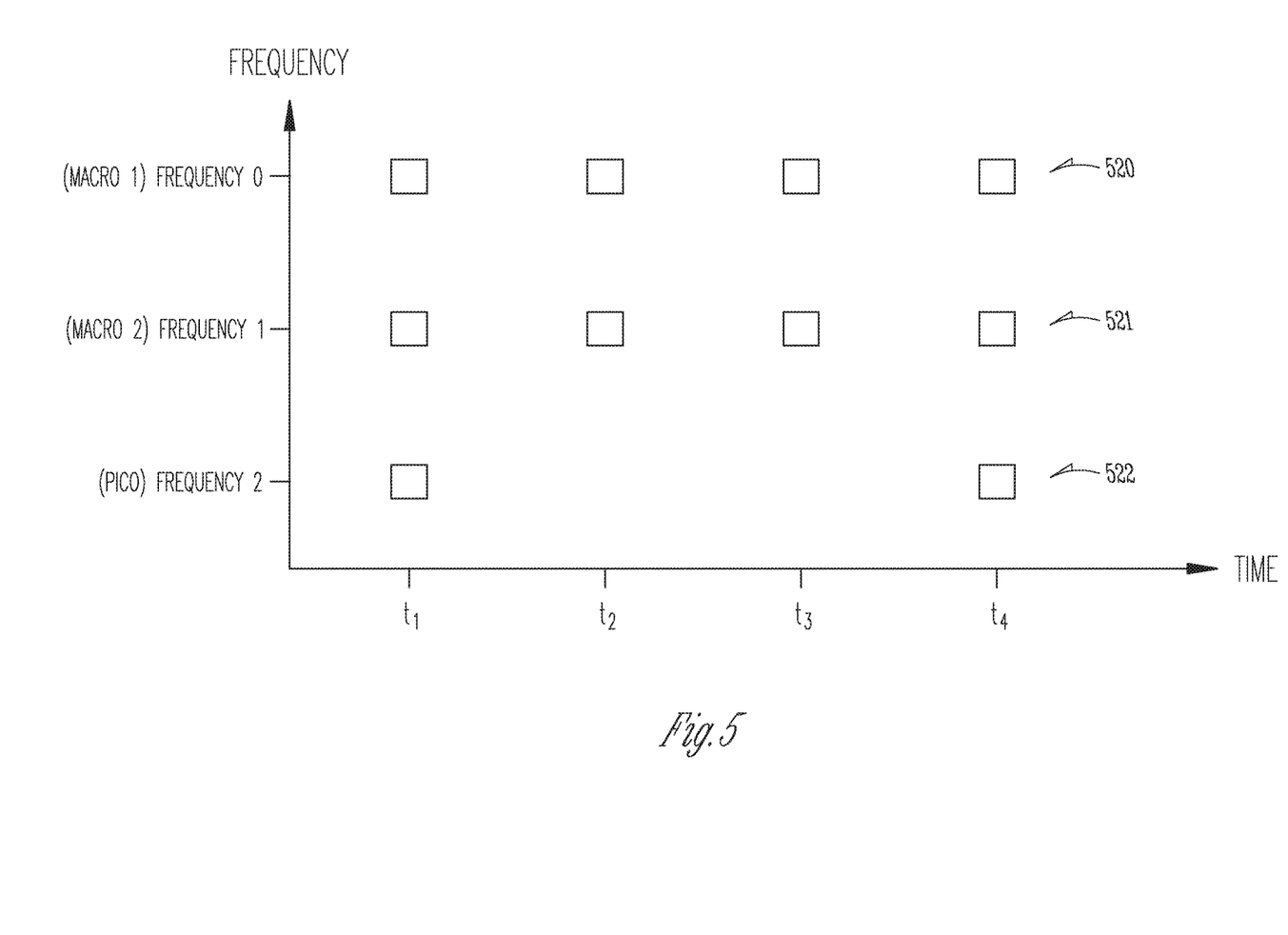
FIG. 5 illustrates a diagram of an embodiment of multiple measurement gap repetition patterns as assigned to a UE.

FIG. 5 illustrates a diagram of an embodiment of multiple measurement gap repetition patterns for each UE. The network in this embodiment may assign a different measurement gap repetition pattern to the UE dependent on the use of the frequency (e.g., coverage, offloading).

Two different frequency uses are shown in FIG. 5. Macro-cell 1 and macro-cell 2, assigned Frequency 0 and Frequency 1, respectively, may be used as current serving cells/coverage cells. These frequency usages may use a shorter period for the measurement gap repetition pattern 520, 521. The pico-cell, assigned Frequency 2, may be used for offloading purposes and may be assigned a longer period for the measurement gap repetition pattern 522.

For offloading purposes, the measurement reporting of the neighboring cells may not need to be as urgent since the neighboring cells may be located within the serving cell's coverage area. The measurement reporting of the neighboring cells may be performed as soon as the serving cell's channel quality decreases or the target cell's quality improves since this typically occurs when the UE is moving out from the serving cell's coverage area. Thus, for coverage purposes, more frequent measurements may be desirable with a small measurement gap periodicity while, for offloading purposes, less frequent measurement gaps may be desirable with longer measurement gap periodicity.

Figure 6:
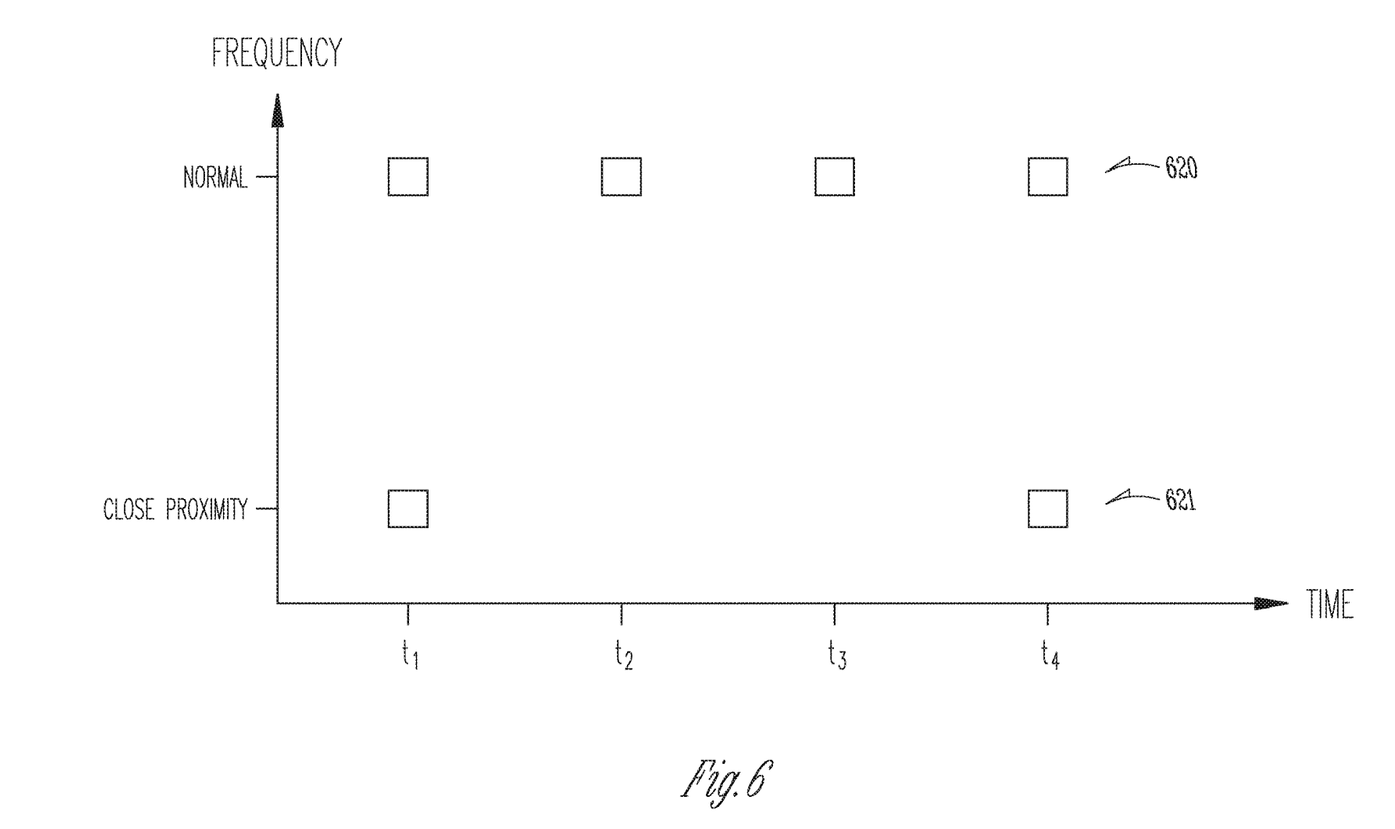
FIG. 6 illustrates a diagram of an embodiment of multiple measurement gap repetition patterns as assigned to a UE based on proximity to a cell antenna.

FIG. 6 illustrates a diagram of an embodiment of multiple measurement gap repetition patterns for each UE based on proximity to cell antenna. As in previous embodiments, the quantity of measurement gap repetition patterns as well as the periods of each measurement gap repetition patterns 620, 621 are for purposes of illustration only.

Two or more measurement gap repetition patterns 620, 621 may be assigned to the UE by the network. The UE may then decide which to use based on the UE's distance from the cell site antenna (as determined by triangulation or GPS coordinates). For example, a normal measurement gap repetition pattern 620 may be used by the UE when the UE is operating at greater than a particular threshold distance from the cell site antenna. When the UE determines that it is closer than the threshold distance from the cell site antenna (e.g., greater signal-to-noise (SNR) ratio, higher signal strength), the UE uses the close proximity measurement gap repetition pattern 621. Depending on the granularity desired for the distances from the cell site antenna, the network may assign more than two proximity measurement gap repetition patterns 620, 621.

Figure 7:
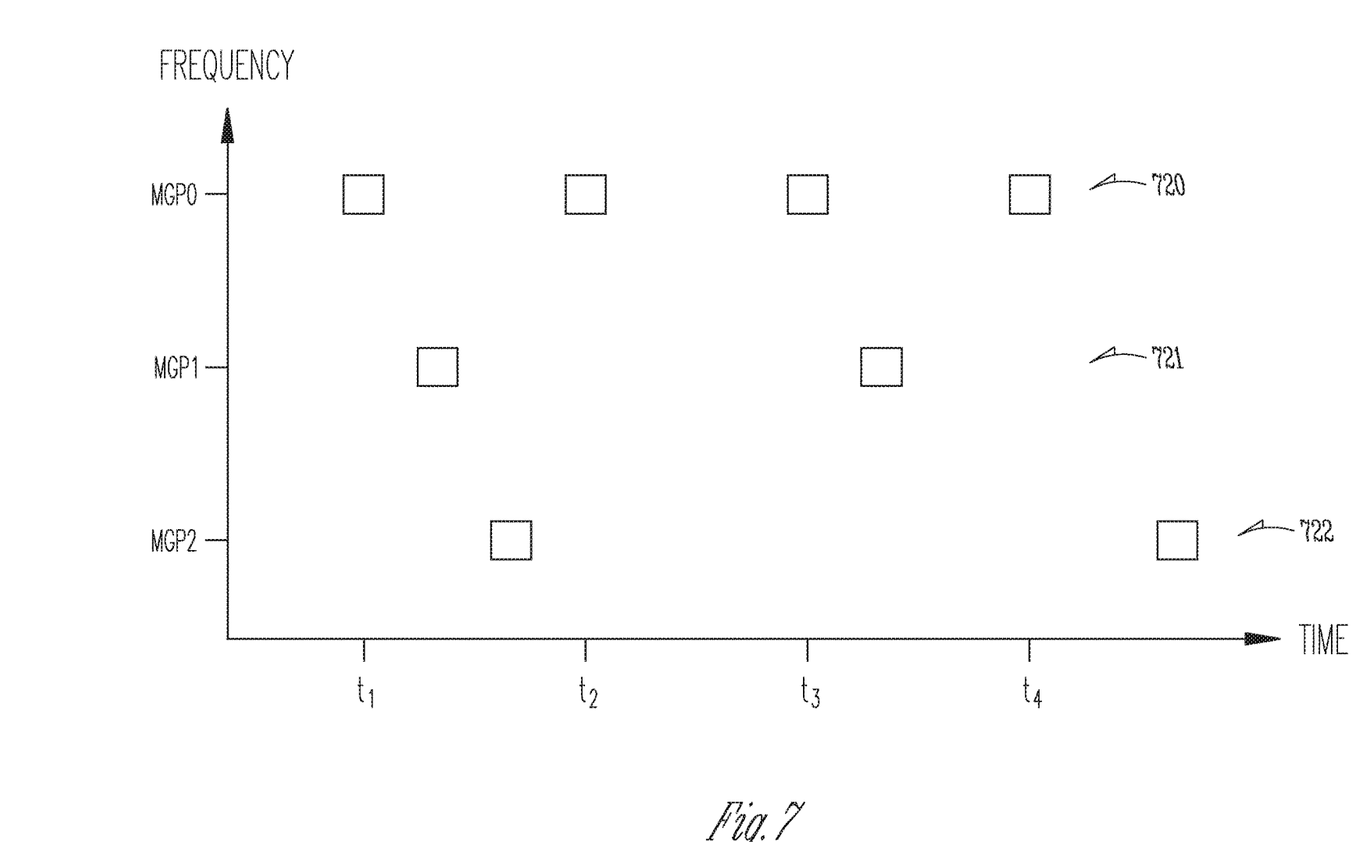
FIG. 7 illustrates a diagram of an embodiment of multiple measurement gap repetition patterns as assigned to a UE with non-colliding measurement gaps.

FIG. 7 illustrates a diagram of an embodiment of multiple measurement gap repetition patterns for each UE with non-colliding measurement gaps. In this embodiment, the network configures the measurement gap repetition patterns 720-722 per list of measurement objects (i.e., configurations by the network as applied to individual frequencies). Thus, this embodiment enables not only multiple measurement gap repetition patterns 720-722 to be configured per UE but each measurement gap repetition pattern 720-722 may be assigned to one or more frequencies.

The network may independently optimize the measurement gap repetition patterns 720-722 per list of measurement objects based on difference criteria. The difference criteria may include throughput, UE power consumption, and measurement delay. The design of each measurement gap repetition pattern 720-722, together with the independently configured time offset, may be accomplished such that there are no collisions between the measurement gaps of differently configured measurement gap repetition patterns 720-722.

As can be seen in FIG. 7, while each measurement gap repetition pattern is periodic, they may not be based on integer multiples of the measurement gap repetition pattern having the shortest period. For example, MGP0 has the shortest period measurement gap repetition pattern 720 with the measurement gaps occurring on $t_1$, $t_2$, $t_3$, and $t_4$. The measurement gaps of MGP1 721 and MGP2 722 may occur any time after $t_1$ as long as neither occurs during the measurement gaps of the other patterns.

In this embodiment, the list of measurement reporting configurations and the list of measurement reporting configurations to remove can be independently configured per measurement gap repetition pattern. The list of measurement identities and the list of measurement identities to remove can be configured independently per measurement gap repetition pattern. A pico-cell quality threshold, controlling whether the UE performs measurements of intra-frequency, inter-frequency, and inter-RAT neighboring cells may be independently configured. The measurements and the lengths of measurement gaps with different measurement gap repetition patterns may be different. The minimum time period between measurement gaps from different measurement gap repetition patterns may be long enough such that the UE can re-gain timing and frequency synchronization of a serving cell.

Figure 8:
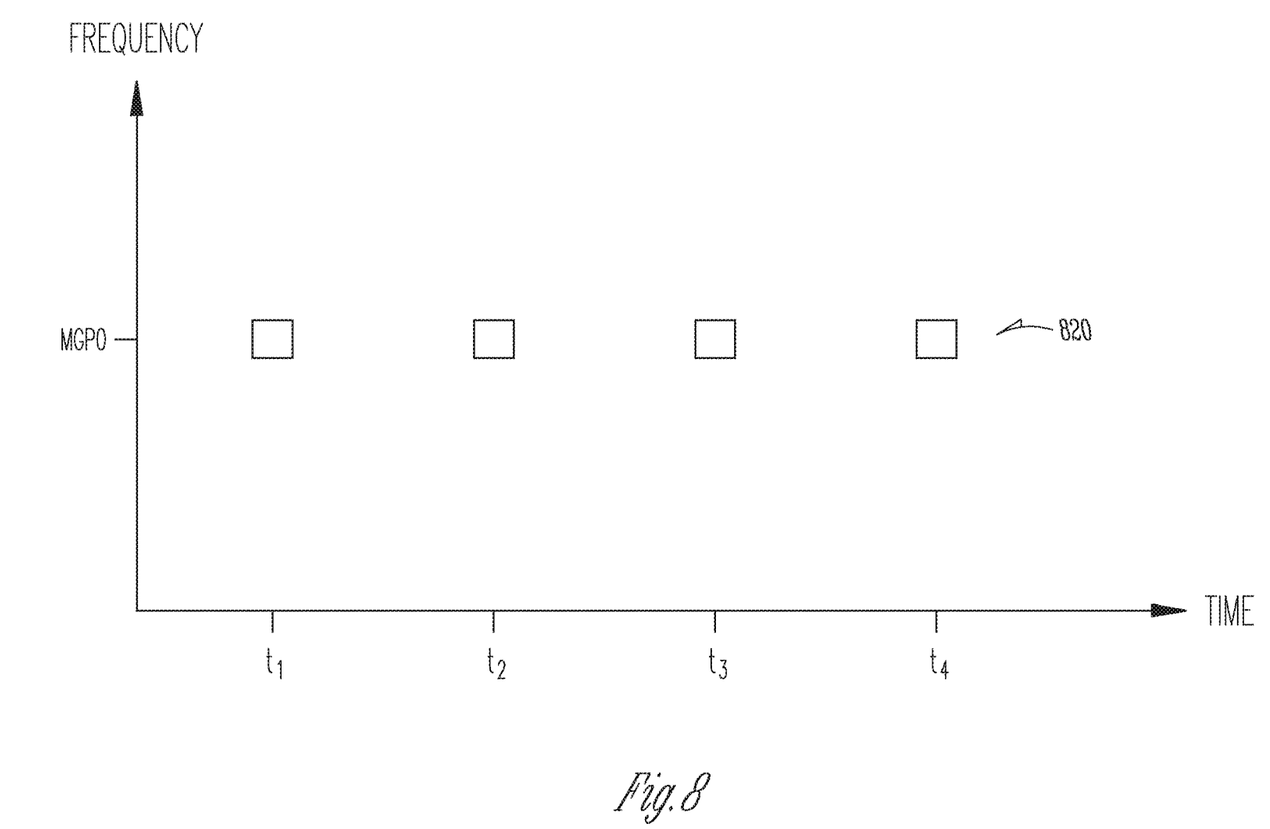
FIG. 8 illustrates a diagram of an embodiment of one measurement gap per UE with different measurements per frequency layer or group of layers.

FIG. 8 illustrates a diagram of an embodiment of one measurement gap repetition pattern 820 per UE with different measurements per frequency layer or group of layers. For example, assume that Frequency 1 and Frequency 2 are assigned to coverage layers (e.g., macro-cells) and Frequency 3 and Frequency 4 are assigned to offloading layers (e.g., pico-cells, femto-cells). The UE may have a measurement gap repetition pattern with one fixed period (e.g., 40 ms), but the measurements for Frequency 1 and Frequency 2 are different than those for Frequency 3 and Frequency 4 since coverage layers typically need different measurements than offloading layers that are more delay tolerant.

This embodiment may be implemented by specifying a relative offset and measurement period per frequency or per frequency group. Another embodiment may implement by setting a measurement gap per UE but specifying a relative offset and measurement period per frequency of frequency group.

Another embodiment may include the network base station transmitting the measurement gap pattern repetition period in a measurement object frame from each RAT. Since the measurement object for each RAT is associated with a different frequency, only a single measurement gap pattern repetition period may be assigned to any one frequency.

Figure 9:
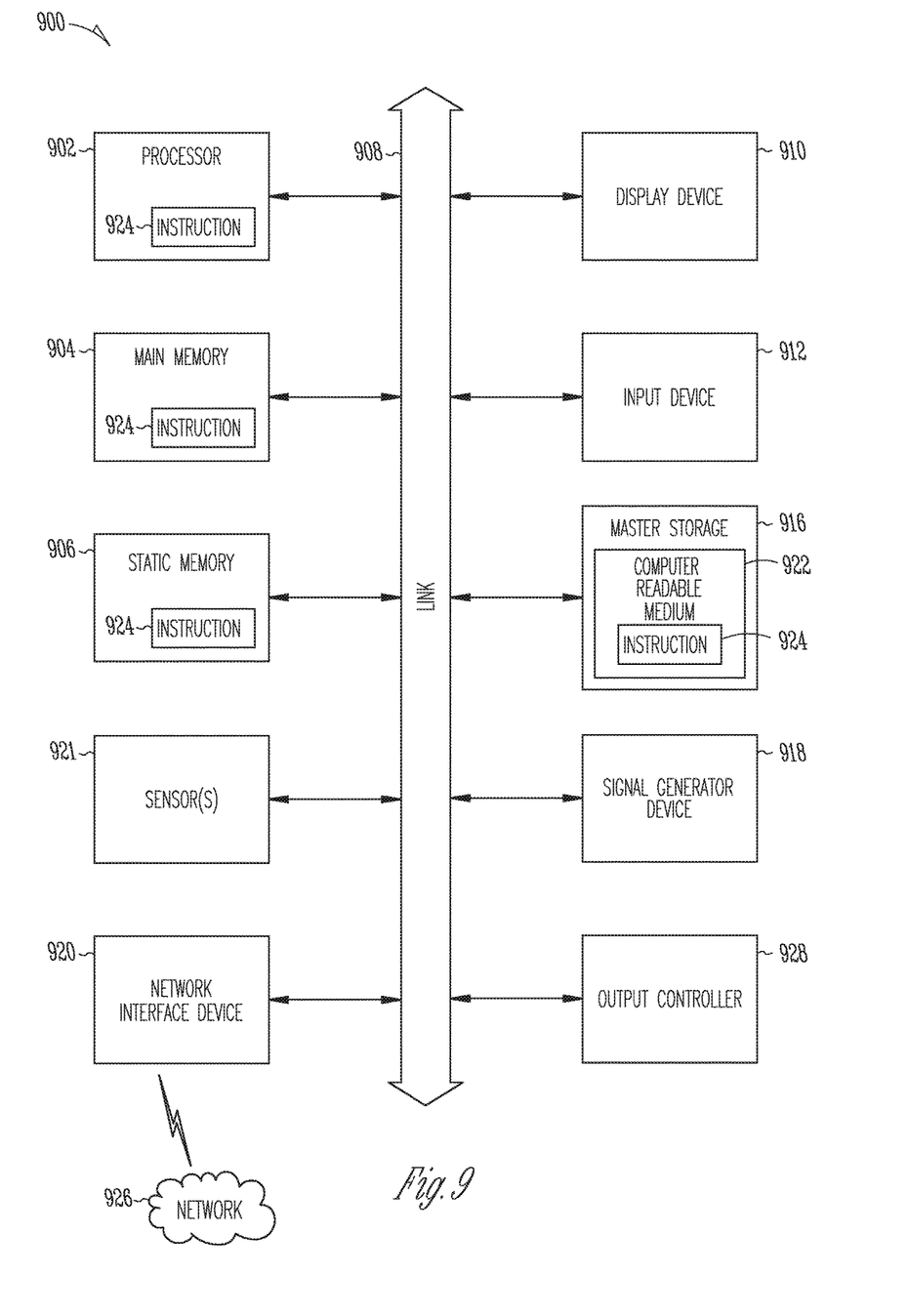
FIG. 9 illustrates a block diagram of an embodiment of an apparatus.

FIG. 9 is a block diagram illustrating a communication apparatus (e.g., machine) in the example form of a UE, an access point (AP), or a cellular base station (e.g., eNodeB), within which a set or sequence of instructions may be executed to cause the communication apparatus to perform any one of the methodologies discussed herein, according to an example embodiment. In alternative embodiments, the communication apparatus operates as a standalone device or may be connected (e.g., networked) to other communication apparatuses. The communication apparatus may be a mobile communication device (e.g., cellular telephone), a computer, a personal computer (PC), a tablet PC, a hybrid tablet, a personal digital assistant (PDA), or any communication apparatus capable of executing instructions (sequential or otherwise) that specify actions to be taken by that communication apparatus. The term "processor-based system" shall be taken to include any set of one or more communication apparatuses that are controlled by or operated by a processor (e.g., a computer) to individually or jointly execute instructions to perform any one or more of the methodologies discussed herein.

Communication apparatus 900 may include at least one controller 902 (e.g., a central processing unit (CPU), a graphics processing unit (GPU) or both, processor cores, compute nodes, etc.), a main memory 904 and a static memory 906, which communicate with each other via a link 908 (e.g., bus). The communication apparatus 900 may further include a display unit 910 (e.g., video, LED, LCD) and an alphanumeric input device 912 (e.g., a keypad). In one embodiment, the display unit 910 and input device 912 may be incorporated as one unit as a touch screen display. The communication apparatus 900 may additionally include a storage device 916 (e.g., a drive unit), a signal generation device 918 (e.g., a speaker), a network interface device 920, and one or more sensors (not shown). The network interface device 920 may include one or more radios (e.g., transmitters and receivers) coupled to one or more antennas in order to communicate over a wireless network channel 926.

The storage device 916 includes a computer-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the communication apparatus 900, with the main memory 904, static memory 906, and the processor 902 also constituting computer-readable media.

While the computer-readable medium 922 is illustrated in an example embodiment to be a single medium, the term "computer-readable medium" may include a single medium or multiple media (e.g., a centralized or distributed database, and/or associated caches and servers) that store the one or more instructions 924.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WI-FI™, 3G, and 4G LTE/LTE-A or WiMAX networks). The term "transmission medium" shall be taken to include any intangible medium that is capable of storing, encoding, or carrying instructions for execution by the communication apparatus, and includes digital or analog communications signals or other intangible medium to facilitate communication of such software. The network interface device may include one or more antennas for communicating with the wireless network.

Figure 10:
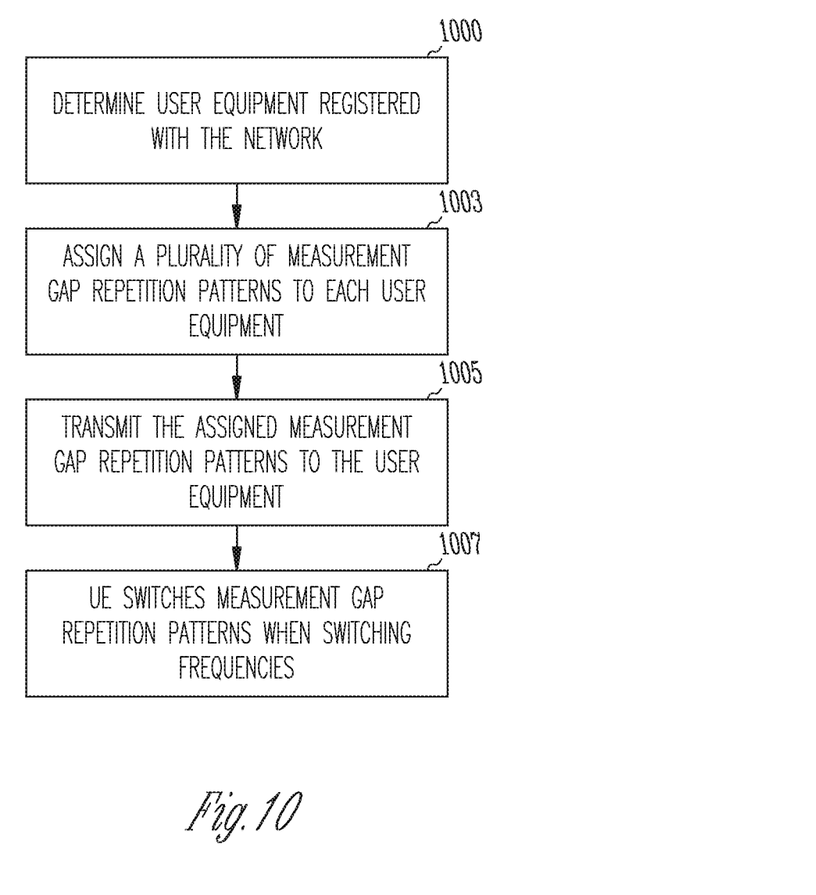
FIG. 10 illustrates a flowchart of an embodiment of a method for assigning a plurality of measurement gap repetition patterns to a UE.

FIG. 10 illustrates a flowchart of an embodiment of a method for assigning a plurality of measurement gap repetition patterns to a UE. This method may take the form of instructions executed by the controller (e.g., processor) of the communication apparatus of FIG. 9.

Block 1000 includes determining which UEs are registered with the network. Block 1003 includes assigning a plurality of measurement gap repetition patterns to each UE registered with the network. This may include assigning a different measurement gap repetition pattern to each frequency over which a base station may operate. One or more of the measurement gap repetition patterns may include a skipping repetition pattern as disclosed previously. Various other measurement gap repetition patterns may also be determined as disclosed previously.

Block 1005 includes transmitting the plurality of measurement gap repetition patterns to each UE. This may be accomplished by the controller controlling transmission from one or more radios of the communication apparatus of FIG. 9. In block 1007, the UE may move from a first cell (e.g., macro-cell frequency layer) to a second cell (e.g., offloading cell frequency layer) and switch from the measurement gap repetition pattern assigned to the first frequency layer to the measurement gap repetition pattern assigned to the second frequency layer.

The Abstract is submitted with the understanding that it will not be used to limit or interpret the scope or meaning of the claims. The following claims are hereby incorporated into the detailed description, with each claim standing on its own as a separate embodiment.

EXAMPLES

The following examples pertain to further embodiments.

Example 1 is a communication apparatus for communicating over a wireless channel, the communication apparatus comprising: a network interface device configured to communicate over the wireless channel with a plurality of user equipment; and a controller coupled to the network interface to control operation of the communication apparatus, the controller configured to assign a plurality of measurement gap repetition patterns to each user equipment.

In Example 2, the subject matter of Example 1 can optionally include wherein the controller is further configured to assign a plurality of measurement gap skipping patterns as part of the plurality of measurement gap repetition patterns.

In Example 3, the subject matter of Examples 1-2 can optionally include wherein the controller is further configured to assign a measurement gap repetition pattern for normal performance group cells and a second measurement gap repetition pattern for reduced performance group cells as part of the plurality of measurement gap repetition patterns.

In Example 4, the subject matter of Examples 1-3 can optionally include wherein the controller is further configured to assign a measurement gap pattern based on proximity to a base station as part of the plurality of measurement gap repetition patterns.

In Example 5, the subject matter of Examples 1-4 can optionally include wherein the controller is further configured to control transmission of a repetition period in a measurement object to each user equipment of the plurality of use equipment.

In Example 6, the subject matter of Examples 1-5 can optionally include wherein the controller is further configured to assign multiple measurement gap repetition patterns to each user equipment such that the measurement gaps of each repetition pattern assigned to a user equipment are non-colliding with measurement gaps of other repetition patterns assigned to the user equipment.

In Example 7, the subject matter of Examples 1-6 can optionally include wherein the controller is further configured to assign one measurement gap repetition pattern per user equipment, each pattern having different measurements per frequency or group of frequencies.

In Example 8, the subject matter of Examples 1-7 can optionally include wherein communication apparatus is an eNodeB base station and the network interface device comprises a radio and memory.

In Example 9, the subject matter of Examples 1-8 can optionally include wherein the radio is configured to operate over a Long Term Evolution (LTE) standard network.

In Example 10, the subject matter of Examples 1-9 can optionally include wherein the base station is configured to generate a macro-cell, a pico-cell, and/or a femto-cell, wherein the pico-cell and femto-cell are offloading cells.

In Example 11, the subject matter of Examples 1-10 can optionally include wherein the controller is further configured to assign a different measurement gap repetition pattern for each frequency over which the network interface device communicates.

Example 12 is a method for assigning measurement gaps repetition patterns to user equipment, the method comprising: assigning a plurality of measurement gap repetition patterns to each respective user equipment registered with a network; and transmitting the plurality of measurement gap repetition pattern to each respective user equipment.

In Example 13, the subject matter of Example 12 can optionally include wherein transmitting the plurality of measurement gap repetition patterns comprises transmitting the plurality of measurement gap repetition patterns with a measurement object frame.

In Example 14, the subject matter of Examples 12-13 can optionally include wherein the measurement object frame is transmitted from each radio access technology radio of the network.

In Example 15, the subject matter of Examples 12-14 can optionally include wherein assigning the plurality of measurement gap repetition patterns comprises assigning a different measurement gap repetition pattern to each frequency used by the network.

In Example 16, the subject matter of Examples 12-15 can optionally include wherein assigning the plurality of measurement gap repetition patterns comprises assigning a measurement gap skipping pattern to each user equipment.

In Example 17, the subject matter of Examples 12-16 can optionally include wherein assigning the plurality of measurement gap repetition patterns comprises assigning a measurement gap repetition pattern for normal performance group cells and a second measurement gap repetition pattern for reduced performance group cells of the network.

In Example 18, the subject matter of Examples 12-17 can optionally include wherein assigning the plurality of measurement gap repetition patterns comprises assigning a measurement gap pattern based on proximity to a base station of the network.

In Example 19, the subject matter of Examples 12-18 can optionally include wherein assigning the plurality of measurement gap repetition patterns comprises assigning a repetition period to each frequency of the network, further comprising transmitting the repetition period to each user equipment in a measurement object frame.

In Example 20, the subject matter of Examples 12-19 can optionally include wherein assigning the plurality of measurement gap repetition patterns comprises assigning non-colliding measurement gaps to each user equipment Example 21 is a non-transitory computer-readable storage medium that stores instructions for execution by one or more processors to perform operations comprising: determine user equipment registered with a wireless network; assign a plurality of measurement gap repetition patterns to each respective user equipment registered with the network; and transmit the plurality of measurement gap repetition patterns to each respective user equipment.

In Example 22, the subject matter of Example 21 can optionally include wherein the operations further assign a plurality of measurement gap skipping patterns as part of the plurality of measurement gap repetition patterns.

In Example 23, the subject matter of Examples 21-22 can optionally include wherein the operations further assign a measurement gap repetition pattern for macro-cells and a second measurement gap repetition pattern for pico-cells or femto-cells as part of the plurality of measurement gap repetition patterns.

In Example 24, the subject matter of Examples 21-23 can optionally include wherein the operations further assign the plurality of measurement gap repetition patterns to each user equipment such that the measurement gaps of each repetition pattern assigned to a user equipment are non-colliding with measurement gaps of other repetition patterns assigned to the user equipment.

In Example 25, the subject matter of Examples 21-24 can optionally include wherein the operations further assign a different measurement gap repetition pattern to each frequency used by the network.

Example 26 is user equipment comprising: a network interface device, including a radio and an antenna, to communicate with a network; and a processor coupled to the network interface device and configured to control operation of the system, the operation including receiving a plurality of measurement gap repetition patterns from the network, each measurement gap repetition pattern assigned to a different frequency of the network.

In Example 27, the subject matter of Example 26 can optionally include wherein processor is further configured to: control the network interface device to switch from a first frequency, assigned to a macro-cell of the network, to a second frequency, assigned to an offloading cell of the network, as the user equipment moves from the macro-cell to the offloading cell; and switch the user equipment from a first measurement gap repetition pattern of the plurality of measurement gap repetition patterns, assigned to the first frequency, to a second measurement gap repetition pattern of the plurality of measurement gap repetition patterns, assigned to the second frequency.

In Example 28, the subject matter of Examples 26-27 can optionally include wherein the network interface device comprises a plurality of radios, each configured to operate on a different frequency.

What is claimed is:

1. An apparatus of a user equipment (UE) comprising a processor and memory, the processor to:
   configure the UE for a measurement reporting operation, wherein as part of the measurement reporting operation, the processor is configured to:
   decode, from an Evolved Node-B (eNB), control signaling including measurement gap configuration information, wherein the measurement gap configuration information is to specify a measurement gap configuration, and
   wherein the measurement gap configuration information includes a gap offset value, and
   wherein a measurement gap configuration is identified by a gap pattern identifier (ID) that corresponds to one of a plurality of radio access technology (RAT) groups of frequency layers;
   determine, from the measurement gap configuration information a gap pattern ID of a particular measurement gap configuration to be applied in a measurement reporting operation for a particular RAT group, the measurement gap configuration including a corresponding measurement gap length (MGL), a measurement gap repetition period (MGRP), and a minimum time available for inter-frequency and inter-RAT measurements during a predetermined time period; and measure a frequency layer of the RAT group according to the MGL, the MGRP, and the minimum time available for inter-frequency and inter-RAT measurements, and wherein the memory is configured to store the measurement gap configuration information.

2. The apparatus of claim 1, wherein for a gap pattern ID of 0, the UE determines the MGL to be 6 milliseconds (ms), the MGRP to be 40 ms, and the minimum time available for inter-frequency and inter-RAT measurements to be 60 ms, and wherein for a gap pattern ID of 1, the UE determines the MGL to be 6 ms, the MGRP to be 80 ms, and the minimum time available for inter-frequency and inter-RAT measurements to be 30 ms.

3. The apparatus of claim 2, wherein the measurement gap configuration includes a minimum time available for inter-frequency and inter-RAT measurements during a 480 ms period.

4. The apparatus of claim 3, wherein the UE determines the MGL, the MGRP, and the minimum time available for inter-frequency and inter-RAT measurements for a handover decision.

5. The apparatus of claim 4, wherein the processor is configured to generate a measurement report, for transmission to the eNB, based on the measurement of the frequency layer of the RAT group.

6. The apparatus of claim 1, wherein the processor is configured to configure one or more radios to receive the control signaling.

7. The apparatus of claim 2, wherein the UE determines a MGRP value and a minimum available time for inter-frequency and inter-RAT measurements during a 480 ms time period for a first additional gap pattern ID, and a MGRP value and a minimum available time for inter-frequency and inter-RAT measurements during a 480 ms time period for a second additional gap pattern ID, wherein the MGRP value for the second additional gap pattern ID is twice as large the MGRP value for the first additional gap pattern ID, and wherein the minimum available time for inter-frequency and inter-RAT measurements during a 480 ms time period for the first additional gap pattern ID is twice as large as the minimum available time for inter-frequency and inter-RAT measurements during a 480 ms time period for the second additional gap pattern ID.

8. A computer-readable hardware storage device that stores instructions for execution by one or more processors of a user equipment (UE), the instructions to configure the processor to:

configure the UE for a measurement reporting operation including:

decode, from an Evolved Node-B (eNB), control signaling including measurement gap configuration information, wherein the measurement gap configuration information is to specify a measurement gap configuration, and wherein the measurement gap configuration information includes a gap offset value, and wherein a measurement gap configuration is identified by a gap pattern identifier (ID) that corresponds to one of a plurality of radio access technology (RAT) groups of frequency layers;

determine, from the measurement gap configuration information, a gap pattern ID of a particular measurement gap configuration to be applied in a measurement reporting operation for a particular RAT group, the measurement gap configuration including a corresponding measurement gap length (MGL), a measurement gap repetition period (MGRP), and a minimum time available for inter-frequency and inter-RAT measurements during a predetermined time period; and measure a frequency layer of the RAT group according to the MGL, the MGRP, and the minimum time available for inter-frequency and inter-RAT measurements.

9. The computer-readable hardware storage device of claim 8, wherein for a gap pattern ID of 0, the UE determines the MGL to be 6 milliseconds (ms), the MGRP to be 40 ms, and the minimum time available for inter-frequency and inter-RAT measurements to be 60 ms, and wherein for a gap pattern ID of 1, the UE determines the MGL to be 6 ms, the MGRP to be 80 ms, and the minimum time available for inter-frequency and inter-RAT measurements to be 30 ms.

10. The computer-readable hardware storage device of claim 9, wherein the measurement gap configuration includes a minimum time available for inter-frequency and inter-RAT measurements during a 480 ms period, and wherein the UE determines the MGL, the MGRP, and the minimum time available for inter-frequency and inter-RAT measurements for a handover decision.

11. The computer-readable hardware storage device of claim 10, wherein the instructions are to configure the processor to generate a measurement report, for transmission to the eNB, based on the measurement of the frequency layer of the RAT group.

12. The computer-readable hardware storage device of claim 8, wherein the instructions are to configure the processor to configure one or more radios to receive the control signaling.

13. The apparatus of claim 9, wherein the UE determines a MGRP value and a minimum available time for inter-frequency and inter-RAT measurements during a 480 ms time period for a first additional gap pattern ID, and a MGRP value and a minimum available time for inter-frequency and inter-RAT measurements during a 480 ms time period for a second additional gap pattern ID, wherein the MGRP value for the second additional gap pattern ID is twice as large the MGRP value for the first additional gap pattern ID, and wherein the minimum available time for inter-frequency and inter-RAT measurements during a 480 ms time period for the first additional gap pattern ID is twice as large as the minimum available time for inter-frequency and inter-RAT measurements during a 480 ms time period for the second additional gap pattern ID.

14. An apparatus of an Evolved Node-B (eNB) comprising a processor and memory, the processor to:

configure a user equipment (UE) for a measurement reporting operation, wherein as part of the measurement reporting operation, the processor is configured to:

encode control signaling, for transmission to the UE, the control signaling including measurement gap configuration information, wherein the measurement gap configuration information is to specify a measurement gap configuration, the measurement gap configuration including a corresponding measurement gap length (MGL), a measurement gap repetition period (MGRP), and a minimum time available for inter-frequency and inter-radio access technology (RAT) measurements during a predetermined time period, and wherein the measurement gap configuration is identified by a gap pattern identifier (ID) that corresponds to one of a plurality of RAT groups of frequency layers; and decode, from signaling received from the UE, a measurement report based on a measurement of a frequency layer of a particular RAT group, wherein the measurement of the frequency layer of the particular RAT group is determined according to a particular measurement gap configuration corresponding to a gap offset value and the gap pattern ID, and wherein the memory is configured to store the measurement report.

15. The apparatus of claim 14, wherein for a gap pattern ID of 0, the UE determines the MGL to be 6 milliseconds (ms), the MGRP to be 40 ms, and the minimum time available for inter-frequency and inter-RAT measurements to be 60 ms, and wherein for a gap pattern ID of 1, the UE determines the MGL to be 6 ms, the MGRP to be 80 ms, and the minimum time available for inter-frequency and inter-RAT measurements to be 30 ms, and wherein the measurement gap configuration includes a minimum time available for inter-frequency and inter-RAT measurements during a 480 ms period.

16. The apparatus of claim 14, wherein the processor is configured to configure the eNB for a handover decision based on the measurement report.

17. The apparatus of claim 15, wherein the UE determines a MGRP value and a minimum available time for inter-frequency and inter-RAT measurements during a 480 ms time period for a first additional gap pattern ID, and a MGRP value and a minimum available time for inter-frequency and inter-RAT measurements during a 480 ms time period for a second additional gap pattern ID, wherein the MGRP value for the second additional gap pattern ID is twice as large the MGRP value for the first additional gap pattern ID, and wherein the minimum available time for inter-frequency and inter-RAT measurements during a 480 ms time period for the first additional gap pattern ID is twice as large as the minimum available time for inter-frequency and inter-RAT measurements during a 480 ms time period for the second additional gap pattern ID.

18. A computer-readable hardware storage device that stores instructions for execution by one or more processors of a Evolved Node-B (eNB), the instructions to configure the processor to:

configure a user equipment (UE) for a measurement reporting operation, wherein as part of the measurement reporting operation, the instructions are to configure the processor to:

encode control signaling, for transmission to the UE, the control signaling including measurement gap configuration information, wherein the measurement gap configuration information is to specify a measurement gap configuration, the measurement gap configuration including a corresponding measurement gap length (MGL), a measurement gap repetition period (MGRP), and a minimum time available for inter-frequency and inter-radio access technology (RAT) measurements during a predetermined time period, and wherein the measurement gap configuration is identified by a gap pattern identifier (ID) that corresponds to one of a plurality of RAT groups of frequency layers;

decode, from signaling received from the UE, a measurement report based on a measurement of a frequency layer of a particular RAT group, wherein the measurement of the frequency layer of the particular RAT group is determined according to a particular measurement gap configuration corresponding to a gap offset value and the gap pattern ID; and configure the eNB for a handover decision based on the measurement report.

19. The apparatus of claim 18, wherein for a gap pattern ID of 0, the UE determines the MGL to be 6 milliseconds (ms), the MGRP to be 40 ms, and the minimum time available for inter-frequency and inter-RAT measurements to be 60 ms, and wherein for a gap pattern ID of 1, the UE determines the MGL to be 6 ms, the MGRP to be 80 ms, and the minimum time available for inter-frequency and inter-RAT measurements to be 30 ms, and wherein the measurement gap configuration includes a minimum time available for inter-frequency and inter-RAT measurements during a 480 ms period.

20. The apparatus of claim 19, wherein the UE determines a MGRP value and a minimum available time for inter-frequency and inter-RAT measurements during a 480 ms time period for a first additional gap pattern ID, and a MGRP value and a minimum available time for inter-frequency and inter-RAT measurements during a 480 ms time period for a second additional gap pattern ID, wherein the MGRP value for the second additional gap pattern ID is twice as large the MGRP value for the first additional gap pattern ID, and wherein the minimum available time for inter-frequency and inter-RAT measurements during a 480 ms time period for the first additional gap pattern ID is twice as large as the minimum available time for inter-frequency and inter-RAT measurements during a 480 ms time period for the second additional gap pattern ID.

* * * * *